(12) United States Patent
Mada (10) Patent No.: US 10,583,497 B2
(45) Date of Patent: Mar. 10, 2020

(54) RIGID MODULAR HOLDING SYSTEM WITH RADIAL AND AXIAL COMPENSATION

(71) Applicant: Vijay Kumar Mada, Bangalore (IN)

(72) Inventor: Vijay Kumar Mada, Bangalore (IN)

( * ) Notice: Subject to any disclaimer, the term of this patent is extended or adjusted under 35 U.S.C. 154(b) by 0 days.

(21) Appl. No.: 15/525,953

(22) PCT Filed: Jan. 29, 2015

(86) PCT No.: PCT/IB2015/050675
§ 371 (c)(1),
(2) Date: May 11, 2017

(87) PCT Pub. No.: WO2016/075551
PCT Pub. Date: May 19, 2016

(65) Prior Publication Data
US 2017/0304905 A1    Oct. 26, 2017

(51) Int. Cl.
*B23C 5/24*  (2006.01)
*F16D 1/12*  (2006.01)
(Continued)

(52) U.S. Cl.
CPC .......... *B23B 31/026* (2013.01); *B23B 31/028* (2013.01); *B23B 31/1075* (2013.01);
(Continued)

(58) Field of Classification Search
CPC . B23B 31/026; B23B 31/028; B23B 2231/22; B23C 5/2472; Y10T 408/854;
(Continued)

(56) References Cited

U.S. PATENT DOCUMENTS

| 1,358,013 A | * | 11/1920 | Miller | ................ B23C 5/207 |
| | | | | 407/38 |
| 1,376,972 A | * | 5/1921 | Runde | ................ B23C 5/242 |
| | | | | 407/38 |

(Continued)

FOREIGN PATENT DOCUMENTS

| DE | 2804250 A1 * | 8/1979 | ........... B23B 31/028 |
| DE | 3817951 A1 * | 11/1989 | ........... B23B 31/028 |

(Continued)

*Primary Examiner* — Eric A Gates (57) ABSTRACT

The present invention provides a rigid modular holding with axial and radial compensation for multiple and universal application of all machining processes, engineering, machine building, and construction fields where ever applicable for rotary and static systems. Design of modular holding includes male and female portions (401,301) of joining parts machined to the required shape and clearances to accommodate modular locking rigidly with face butting (407, 308). Radial and axial run out adjustments is controlled by the grub screws (307, 306) and run out compensation can be achieved within micron. An Area used for clamping and designed within the area of joining parts results reduction in material and processing cost. Since, the material is not protruding out from the surface of the joining parts, esthetically looks good and convenient for designing multiple applications as it is not possible at present.

8 Claims, 12 Drawing Sheets

(51) Int. Cl.
  *F16D 1/08*     (2006.01)
  *B23B 31/02*    (2006.01)
  *B23B 31/107*   (2006.01)
  *F16D 1/108*    (2006.01)
  *F16D 1/116*    (2006.01)
  *F16D 1/10*     (2006.01)
  *F16L 25/08*    (2006.01)

(52) U.S. Cl.
  CPC .......... *B23C 5/2472* (2013.01); *F16D 1/0847* (2013.01); *F16D 1/12* (2013.01); *B23B 2231/22* (2013.01); *F16D 1/108* (2013.01); *F16D 1/116* (2013.01); *F16D 2001/102* (2013.01); *F16L 25/08* (2013.01); *Y10T 279/17821* (2015.01); *Y10T 279/25* (2015.01); *Y10T 408/45* (2015.01); *Y10T 408/855* (2015.01); *Y10T 408/858* (2015.01); *Y10T 409/30952* (2015.01); *Y10T 409/304032* (2015.01)

(58) Field of Classification Search
  CPC ............ Y10T 408/855; Y10T 408/858; Y10T 279/25; Y10T 279/17821; F16D 1/0847; F16D 1/12
  See application file for complete search history.

(56) References Cited

U.S. PATENT DOCUMENTS

| | | | | |
|---|---|---|---|---|
| 2,828,132 | A * | 3/1958 | MacFarlane | B23B 31/026 279/128 |
| 3,363,299 | A * | 1/1968 | Gowanlock | B23C 5/2413 407/39 |
| 4,610,585 | A * | 9/1986 | Fellmeth | B23B 31/11 279/83 |
| 4,666,353 | A * | 5/1987 | Micek | B23B 31/36 279/158 |
| 4,813,831 | A * | 3/1989 | Reinauer | B23B 31/1076 408/239 R |
| 4,971,491 | A * | 11/1990 | Cook | B23B 31/006 408/1 BD |
| 5,419,661 | A * | 5/1995 | Meachum | B23Q 11/103 408/57 |
| 5,582,494 | A * | 12/1996 | Cook | B23B 31/006 279/158 |
| 6,186,712 | B1 * | 2/2001 | Senzaki | B23B 31/026 279/125 |
| 6,299,180 | B1 * | 10/2001 | Satran | B23B 31/1075 279/83 |
| 6,979,157 | B2 * | 12/2005 | Kleiner | B23B 31/117 279/102 |
| 7,112,020 | B2 * | 9/2006 | Sheffler | B23B 31/005 279/83 |
| 9,149,349 | B2 * | 10/2015 | Gapp | A61C 13/0022 |
| 9,770,770 | B2 * | 9/2017 | Mada | B23C 5/241 |

FOREIGN PATENT DOCUMENTS

| | | | |
|---|---|---|---|
| DE | 19834590 A1 * | 2/2000 | ........... B23B 31/028 |
| DE | 102014225913 B3 * | 3/2016 | ........... B23B 31/026 |
| DE | 102014225914 B3 * | 3/2016 | ........... B23B 31/026 |
| EP | 0501009 A1 * | 9/1992 | ....... B23B 29/03407 |
| EP | 0584075 B1 * | 3/1997 | ............. B23C 5/241 |
| FR | 1520258 A * | 4/1968 | ........... B23C 5/2413 |
| JP | 09057520 A * | 3/1997 | ........... B23C 5/2472 |
| JP | 3154648 B2 * | 4/2001 | ........... B23C 5/2472 |

* cited by examiner

RIGID MODULAR HOLDING SYSTEM WITH RADIAL AND AXIAL COMPENSATION

FIELD OF INVENTION

The embodiments herein generally relate to the field of machining process, engineering design for shaft clamping and holding system and specifically, relates to a rigid modular holding system with axial and radial compensation. Particularly, relates to a modular holding system providing an accurate run out control or an accurate alignment with high rigidity for rotary or static applications.

BACKGROUND OF THE INVENTION

Tools and holders are required to be worked in high speed machines at maximum speed and feed to perform a required operation in less time. In the current era, side lock holding system is used for locking the holder. The holding system can be designed to rigidly lock the modular system by axial locking screws with face butting. Whereas, the existing holding system is not having any system to control axial or radial run out.

Figure 1:
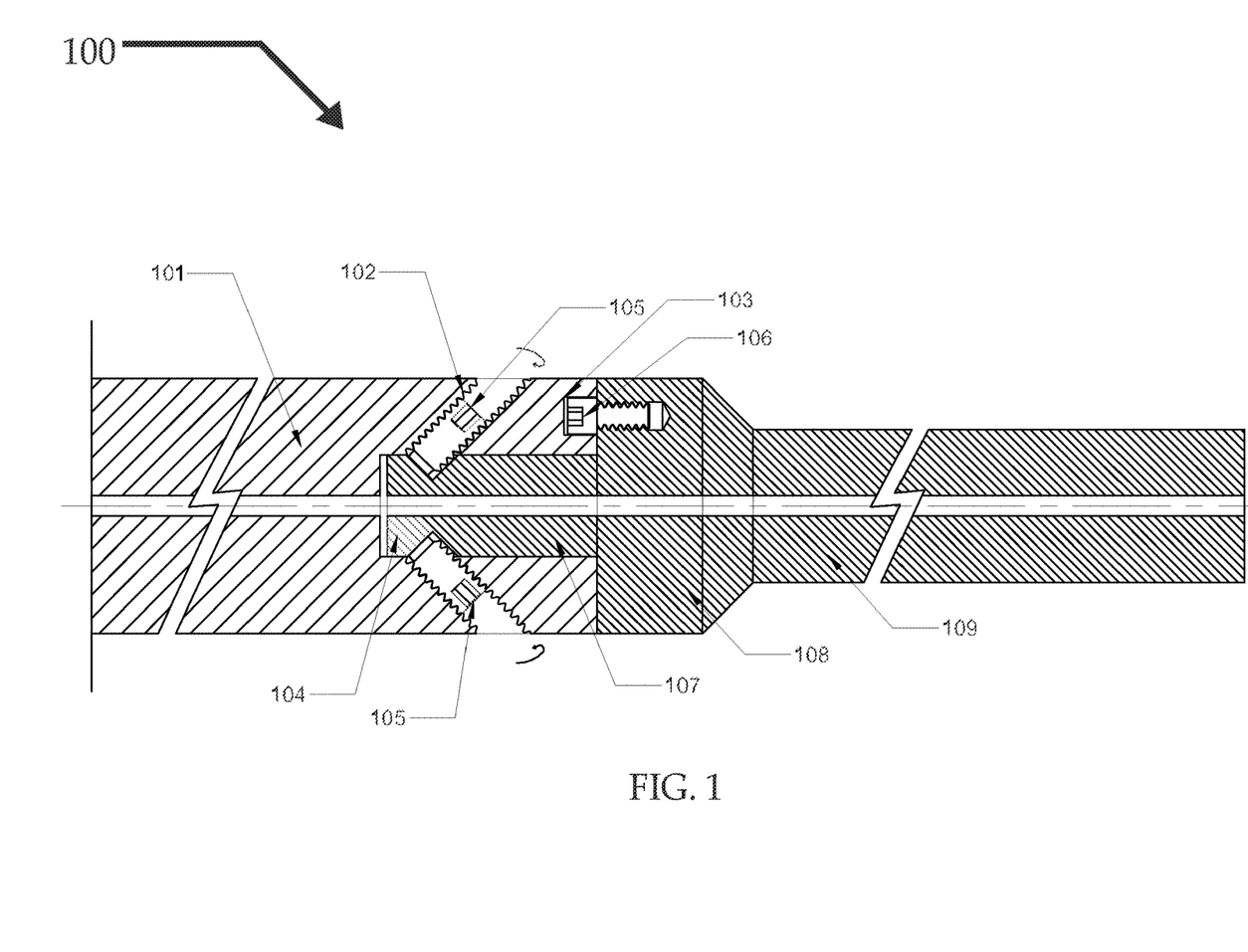
FIG. 1 illustrates an existing angular holding locking system, according to an embodiment therein.

FIG. 1 illustrates an existing angular holding locking system. In the existing system, locking is done by Locking Screws 105 in an angular direction with face butting and locking for anti rotation is done by Pin 106 which has become weak and also restricts application for designing.

Further, rigid holding with radial and axial compensation was not possible in the existing system. Hence, the existing system was designed for adjusting axial run out by grub screws mounted parallel to the butting faces and locking is done by angular mounted screws which locks and holds the butting faces and at the same time controls the radial run outs with a simple design.

Figure 21:
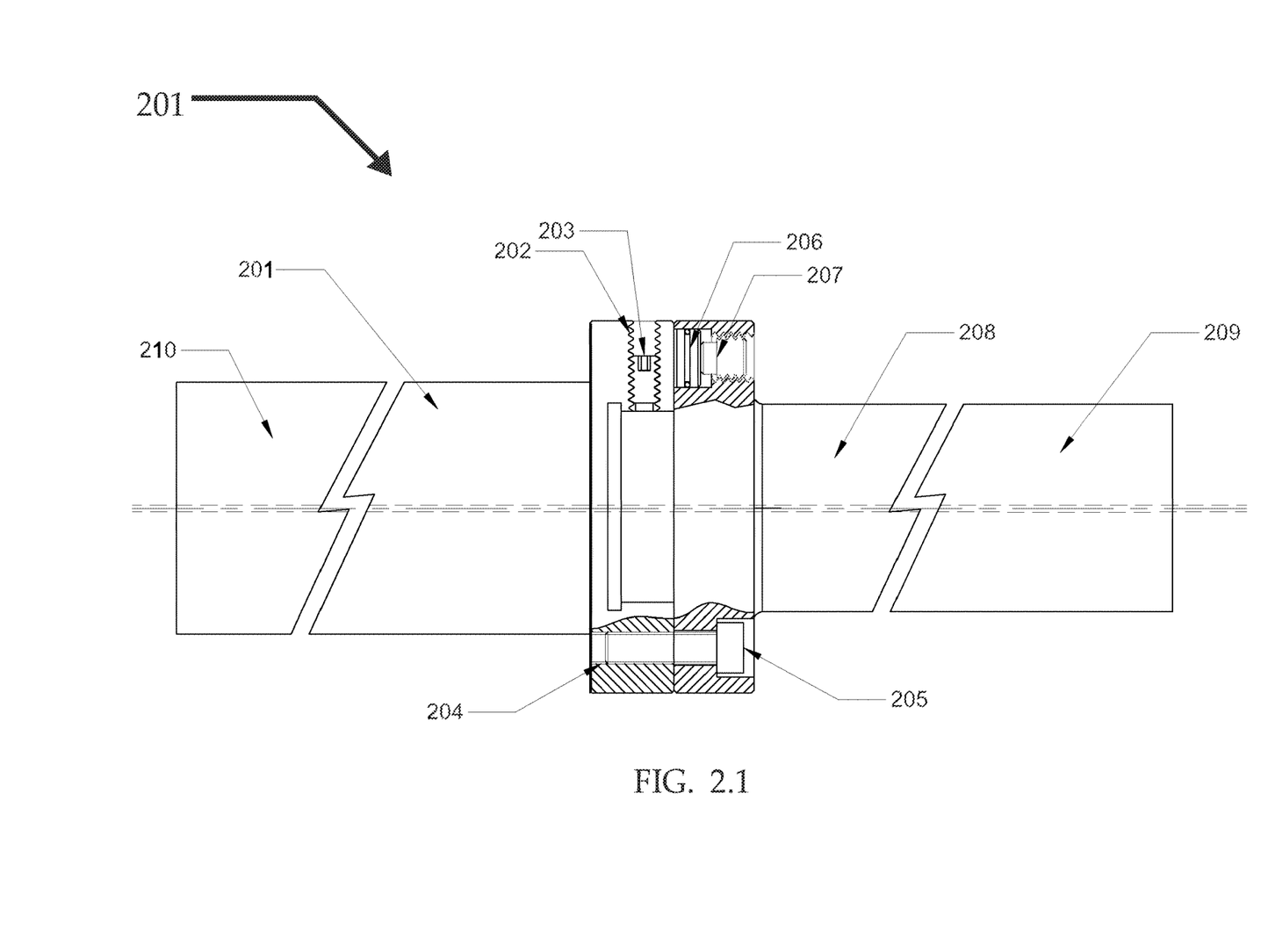

Existing modular holding with radial and axial run out control is in use at present is explained in FIG. 2.1. Modular locking is achieved by face butting of the flanges 211 which can be protruded out from an outside diameter of joining parts in order to accommodate the locking bolts 205. Further, the existing system uses higher diameter material to get the required sizes which is causing high material cost of approximately 2 to 3 times and also includes machine hour cost. Here, axial run out is controlled by Screw 203 and radial run out is controlled by Bullet 206 and grub screws 207. Radial run out can be achieved by tightening Screws 207 which in turn deflects the flange and high force is required to achieve the same.

At the same time, deflection will result into fine gap between the flanges and large area of the flange has to be designed to achieve the same. With this gap flanges are held by the Bolt, Nuts and Washers 205, 207 and 206 respectively which can have high tension and at the same time may fail many times.

Figure 22:
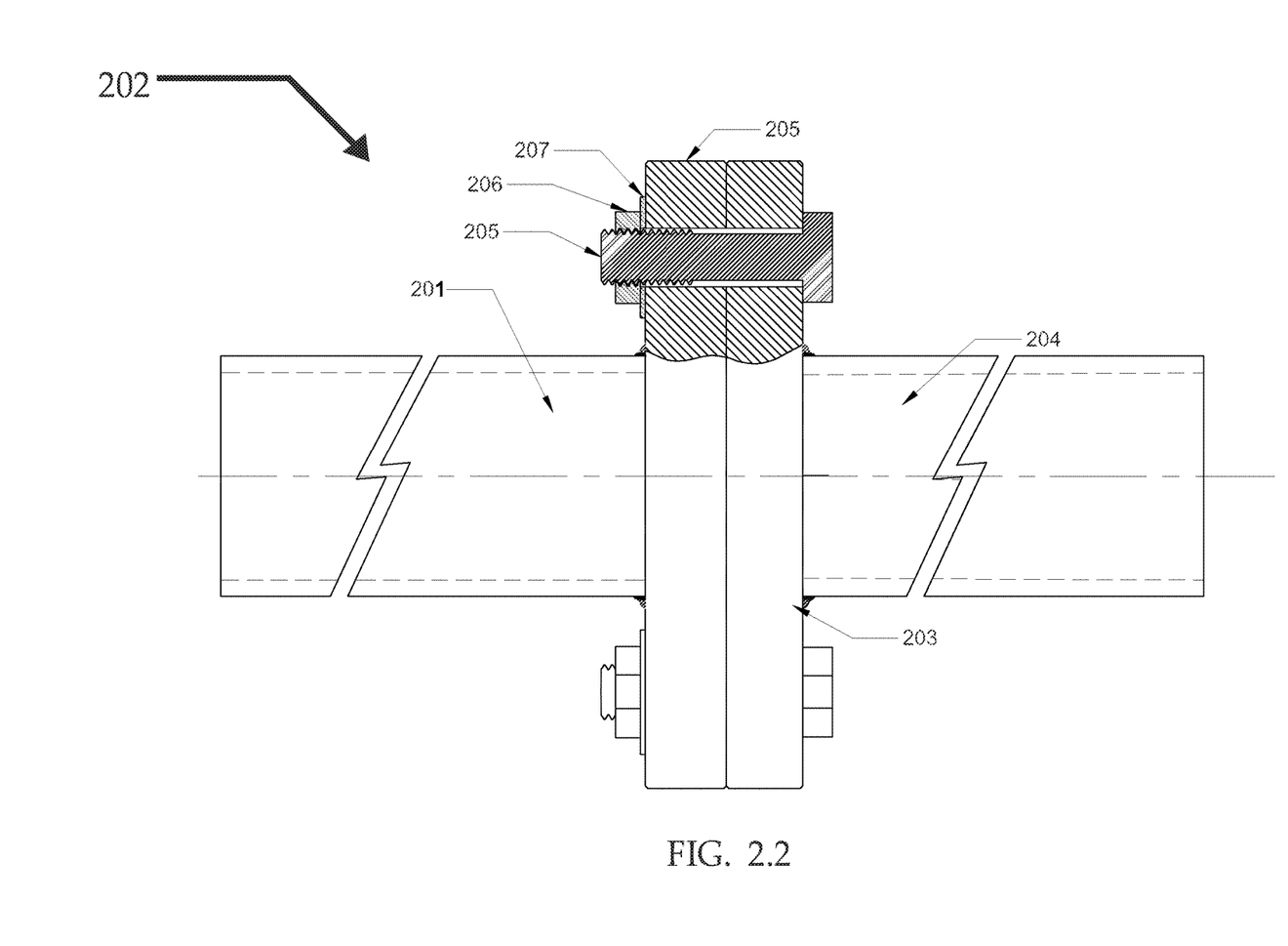

FIG. 2.2 illustrates an existing flange type holding used for coupling or in structural modular holding and joining of two parts can be commonly used design in engineering, machine building and construction field. Here, joining two parts by flanges can be protruding outside and joined by Nuts and Bolts 207 and 203. Number of nut and bolts are required large in number and joining two parts or structure can be achieved without much accuracy with alignment. Higher thickness of flange has to be designed to achieve the rigidity, which incurs higher cost.

Existing modular holding used for holding the cutting tools like hydro grip holding, collet chuck holding where parallel shank holders are held in the shank. Also other existing modular holdings like HFS holding and ABS holding system are held modular with modular clamping. In all these systems, there is no run out adjustment possible axially or radially which is generated due to the holding system or by the spindle in accuracy.

Therefore, there is a need for a rigid modular holding system with axial and radial compensation associated with the prior art. Further, there is a need for a modular holding system to provide accurate run out control with high rigidity for various applications. Still, there is a need for a modular locking system with reduced cost and with a better precision for various applications.

OBJECTS OF THE INVENTION

Some of the objects of the present disclosure are described herein below:

A main object of the present invention is to have a simple design of cost effective modular holding system and at the same time with high rigidity.

Another object of the present invention is to have a modular locking with provision for axial and radial adjustment in microns.

Still another object of the present invention is to design modular holding as minimum as diameter up to 10 mm.

Yet another object of the present invention is to design bigger diameter modular locking system with reduced cost, less material usage, low processing cost, and with less setting time with high rigidity and accuracy.

Another object of the present invention is to design modular holding within a diameter of joining parts and reduction in material is required to avoid material protruding out from the joining faces and that is used to reduce a lot of constraints in the application for designing the system Another object of the present invention is to achieve the run out control in rotary system for reducing the imbalance and vibration. Hence, rotary parts and tools can run with high RPM and with higher feed rates which in turn reduces cost of production.

Another object of the present invention can be used universally in many applications as per the requirement in engineering, tooling, manufacturing, machine building and construction fields.

Another object of the present invention is to design modular designing of combination tools in simple and easy way and at the same time controlling axial and radial run out in multiple modular combinations.

Another object of the present invention is to design a modular holding cartridge for padded type of reamers and can run with higher RPM and higher feed with improvement of rigidity.

Another object of the present invention is to design milling cutters, multi cutting point reamers, inserted type of reamers, and boring bars with the modular design, where axial and radial adjustments can be controlled and can be used for even size control or adjustment of the size.

Another object of the present invention is to have rigid, multiple serial connection in the rigid modular holding with accurate run out control to be used in all engineering applications.

The other objects and advantages of the present invention will be apparent from the following description when read in conjunction with the accompanying drawings which are incorporated for illustration of preferred embodiments of the present invention and are not intended to limit the scope thereof.

SUMMARY OF THE INVENTION

In view of the foregoing, an embodiment herein discloses a rigid modular holding system with axial and radial compensation with high rigidity for rotary and static applications. Modular locking is achieved by one side as a male portion and other as a female portion. Both the sides can be assembled and clamped together and can be designed vice a versa. Modular holding is designed for high rigidity, and face butting of the connecting parts makes the modular locking as a single piece.

According to an embodiment, female portion includes a cylindrical portion may be triangular, hexogen, hectogan cubical portion and not limited to any shape. It has a threaded hole to accommodate corresponding grub screws which is parallel to a butting face. An angular hole with thread accommodates corresponding grub screws. Number of angular hole is designed equivalent to corresponding number of sides. Angular hole is designed with an angle at 45 degree to a centre of the female part and may be designed from 15 degree to up to 75 degree. Here, grub screws are used for an axial adjustment by tightening in the required method to adjust the axial run out. In angular hole, grub screw can be tightened and used for locking the male portion and to achieve the rigid face butting and radial run out can be adjusted in microns.

In an embodiment, a male portion which has a cylindrical portion corresponding to the cylindrical portion of the female portion with the clearance from 10 micron to up to 0.5 mm acts as a locator and also designed based on axial run out requirement and also based on size. The cylindrical portion is continued with the cubical portion and may be cylindrical or any other desired shape which has a notch to accommodate angular grub screw for locking. Male and female portion are assembled together for modular locking. Design is made such a way that cylindrical and cubical portion hole on female part have a sufficient space or clearance so that it cannot touch each other while butting except on the butting face. Grub screws perpendicular to the cylindrical portion is tightened as per requirement to adjust the run out near to the butting face on by setting a dial. Axial run out is adjusted up to 0-2 micron. Angular grub screw is tightened and run out can be adjusted radially and once the run out is achieved up to 0 to 2 micron opposite side screw can be locked and other two corresponding screws and also locked in position.

According to an embodiment, axial and radial adjustments can be controlled up to micron level on rotary application. On static modular holding application only rigid locking is required for the purpose of quick alignment and angular screws for locking can be used. An axial adjustment screw is used only if required based on application and design. On application of cutting tools axial adjustment can be used for size variation and angular locking can be used for back tapper adjustment and also for locking of the modular face butting. On single point cutting tools like modular cartridge for milling and inserted type of boring bars, milling cutters or reamers can be used for size adjustment and also for run out adjustment.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The detailed description is set forth with reference to the accompanying figures. In the figures the use of the same reference numbers in different figures indicates similar or identical items.

FIG. 2.1 illustrates an existing modular holding used in modular holding for axial and radial adjustment and FIG. 2.2 showing an existing flange type holding used for coupling or in structural modular holding in construction field, according to an embodiment therein;

DETAILED DESCRIPTION OF THE PREFERRED EMBODIMENTS

The embodiments herein and the various features and advantageous details thereof are explained more fully with reference to the non-limiting embodiments and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned above, there remains a need for designing a rigid modular holding system with radial and axial compensation giving high rigidity and good precision. Referring now to drawings, and more particularly to FIGS. 3 through 11, where similar reference characters denote corresponding features consistently throughout the figures, there are shown preferred embodiments.

Figure 3:
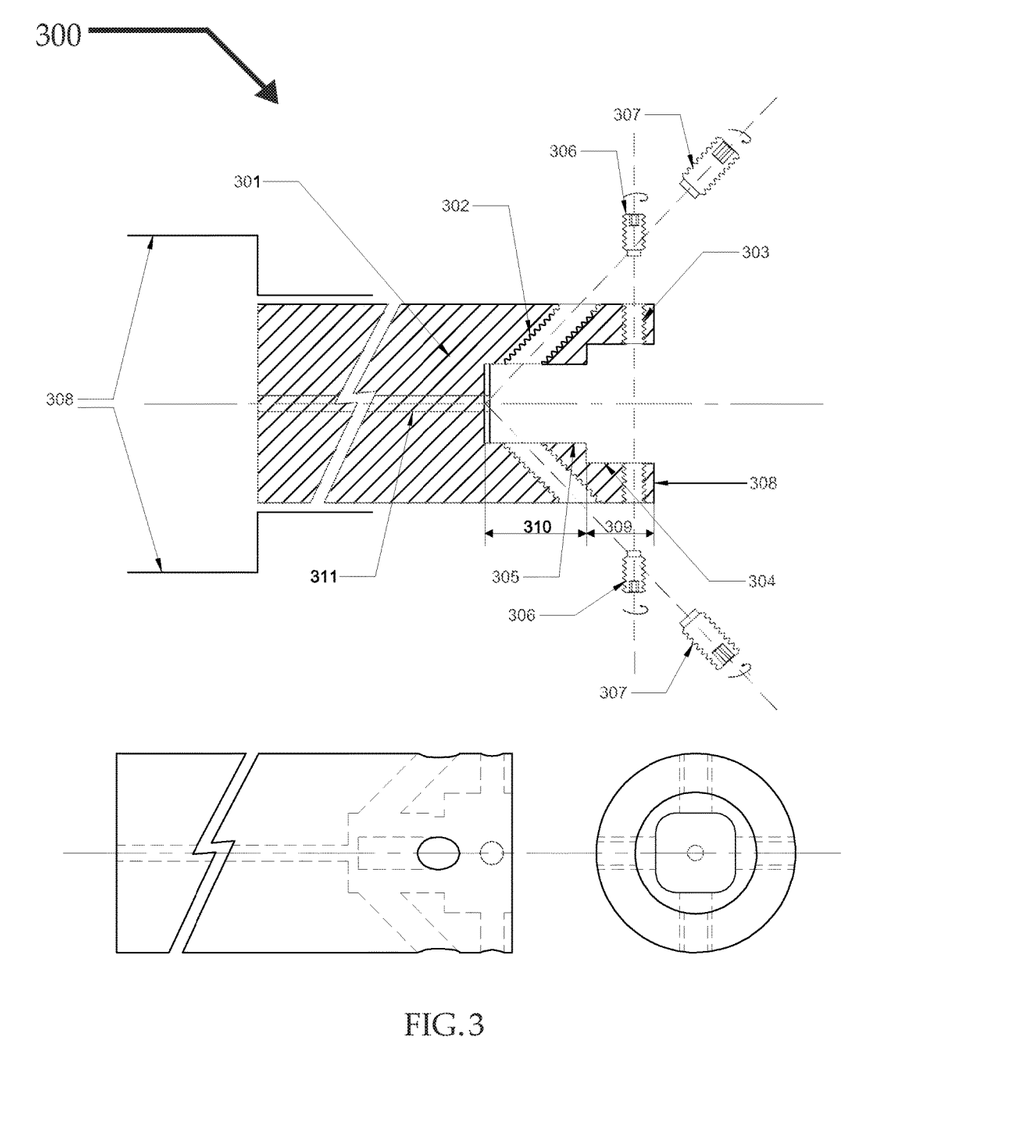
FIG. 3 illustrates a cross sectional view of a female portion of the embodiment here in with parts and the front view, according to an embodiment therein.

According to an embodiment, FIG. 3 a cross sectional view of a female portion 300 of the embodiment here in with parts and the front view. A joining portion of one side of modular locking can be called as female portion 301. Herein embodiment taken as cylindrical shape but not limited to joining of triangular, cubical, rectangular, hexagonal, heptagonal etc as per the design requirement. Butting face and inside contour can be machined accurately to the required size as per the design and the other side of the female part can be machine spindle holder of any design for example BT holders, ISO holders, HSK holders and also not limited to combination tools, multiple series connections, structural member coupling, motor shafts etc. which require modular connection as per application and design. Corresponding female side is having cylindrical hole 304 as mentioned in above embodiment and shape is not limited to triangular, cubical, rectangular, hexagonal, heptagonal etc as per the design requirement. 309 and 310 are respective depth of cylindrical and cubical parts of 301. Central through coolant 311 can be concentric or can be designed as per the requirement. Having threaded holes 303 perpendicular to cylindrical portions 304 and at the same time parallel and near to the butting face. Cylindrical portion is continued with cubical part 305 concentric to the female part and the shape is not limited to cylindrical, triangular, cubical, rectangular, hexagonal, heptagonal etc as per the design requirement. Threaded hole 302 in angular direction as shown and the desired angle is as shown as 45 degree in the embodiment and not limited to 15 degree-75 degree. As per the design and application requirement number of threaded holes 302 and 303 are in four numbers each but not limited to 1, 2, 3, 4, 6, 8 or equaling to number of sides designed.

Figure 4:
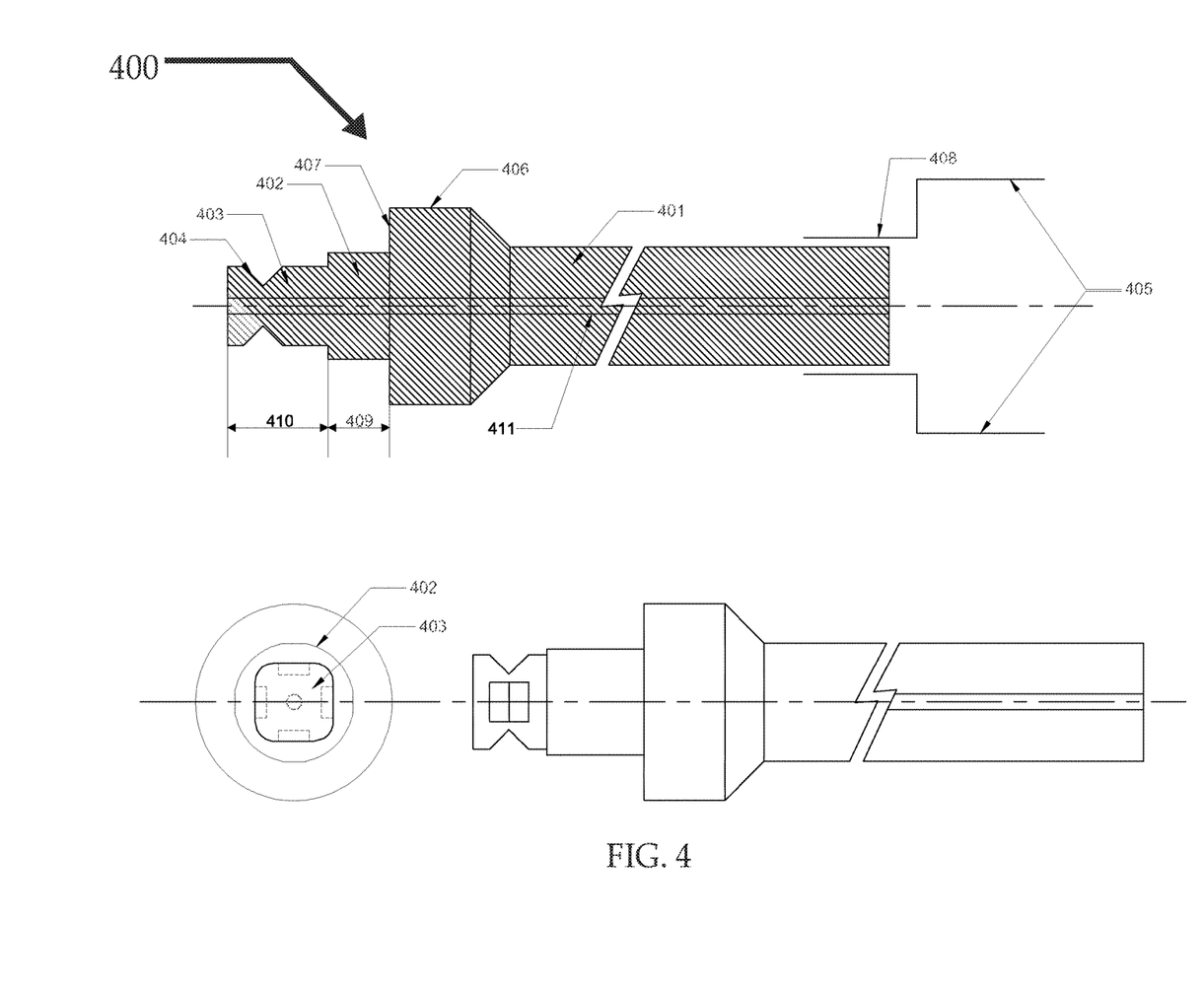
FIG. 4 illustrates a cross sectional view of a male portion of the embodiment here in with parts and the front view, according to an embodiment therein.

In an embodiment, FIG. 4 a cross sectional view of a male portion 400 of the embodiment here in with parts and the front view. A joining portion of another side of modular locking can be called as male portion 401. Herein embodiment taken as cylindrical shape but not limited to joining of triangular, cubical, rectangular, hexagonal, hectogonal etc as per the design requirement. Butting face and projected portion can be machined accurately to the required size as per the design and matching with the other butting female portion accurately with the required clearance as per the design concentric to the male portion. Here, the cubical portion is machined to the required size but shape is not limited to joining of triangular, cubical, rectangular, hexagonal, hectoganal etc as per the design requirement. Cylindrical portion 402 guides the male portion into the female portion and at the same time can have sufficient clearance for the radial adjustment as per the design. Cylindrical portion 402 is continued with cubical portion 403 but the shape is considered as cubical but not limited to triangular, cubical, rectangular, hexagonal, hectoganal etc as per the design requirement. The size is designed with the required clearances moving freely inside the cubical portion of female part 305 and at the same time have enough clearance for radial adjustment. This cubical portion 403 have notch on the flat portion as shown as 404 may accommodate tightening of the grub screw 307, can act as radial adjustment for compensation locking when tightened locks the butting face 407 and 308 rigidly without any gap at the same time parallel to the axis. The number of notches and the screw is designed as four numbers in the embodiment but not limited to any numbers etc as per the design requirement and application. Here centre through coolant 411 can be designed concentric or as per the application and requirement.

In an embodiment, modular holding system with axial and radial compensation is developed with cylindrical mounting and with cubical locking system in holding parts, which acts as anti rotational as well as guiding and holding the parts together.

According to an embodiment, as shown in FIG. 3 an FIG. 4, male and female portion can have clearance in OD and face as per the design, end of 409 and 410 can have enough clearance so that cannot touch to the female body in the face except 407 and 308 butting together tightly, rigidly without any gap when assembled together.

According to an embodiment, radial and axial run outs and locking can be done by Grub Screws designed by the sizes as per the requirement with very low cost compared to the cost of nuts and bolts, bullets, grub screws and number of parts are reduced considerably.

In an example embodiment, as per FIG. 4, 405 may be a cutting tool, but not limited to reamer, milling cutter, arbor, boring bar, a shaft, motor side, structural part, modular connection required serial connection, cartridge for blade type of reamer, milling cutters or reamers, in modular form etc., as per the design and application for which modular holding is required.

Figure 5:
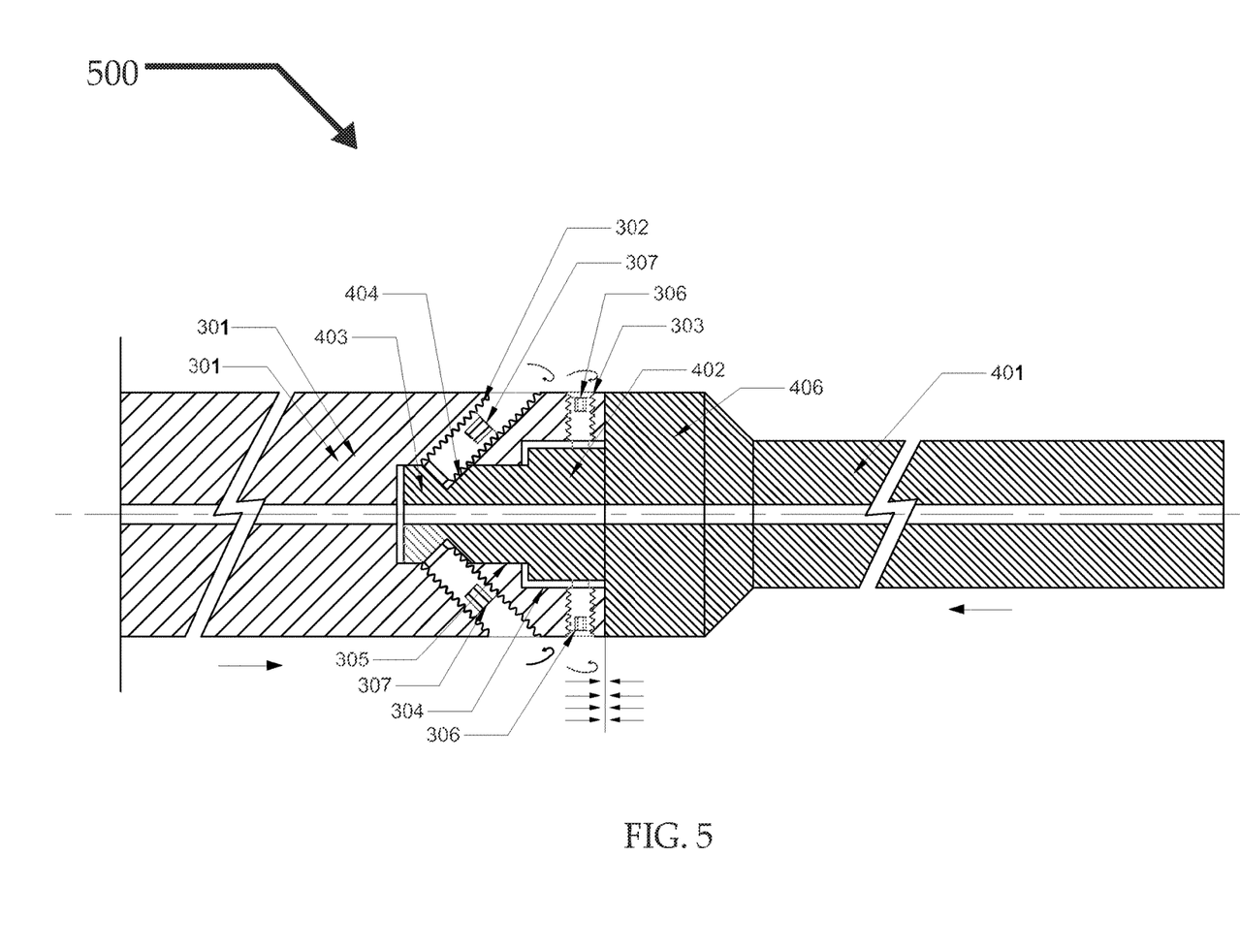
FIG. 5 illustrates assembly with a cross sectional view of a modular holding according to the embodiment herein.

According to an embodiment, FIG. 5 illustrates assembly with a cross sectional view of a modular holding 500 where male and female portion are assembled together by inserting 402 and 403 in respecting mating parts 304 and 305. Screw 307 can be tightened in such a way that it may be locked or inserted inside the groove or notch touching 404. This can enable the 401 positioned in placed with 301 so that 401 may not have any risk of coming out from its position. Now tighten 306 uniformly and make them to just touch flat locking portion of 402 on cylindrical OD. Dial can be mounted on OD of 406 where axial run out to be adjusted by rotating the assembly can identify the highest run out point and inline corresponding screw 306 can be adjusted axial run out very closely up to 0-5 micron. And all other screws 306 tightened moderately to touch the cylindrical locking portion. Now dial can be mounted on 408 highest run out can be checked and inline opposite screw 307 to be tightened to adjust the radial run out within 0-5 micron. Then all other corresponding screws 307 can be tightened to hold the butting face 407 and 308 together rigidly without any gap. Once again dial can be mounted on 406 to check the axial run out if it is disturbed slightly above procedure will be repeated once again to achieve run out as close as 0-2 micron axially and radially. Coolant hole can be taken in the central concentric as shown in the FIG. 5 very easily without affecting the rigidity and also can be designed as per the requirement off centre to the cutting edges or where ever required. Provision of appropriate seal also can be designed butting faces of 407,308 or end of 403 as per the design.

According to an embodiment, a rigid modular holding system with axial and radial compensation is designed where modular locking is achieved within the diameter, size of the joining parts hence amount of material require for modular locking is reduced considerably almost 50% and also considerable reduction in processing cost. With the simple design face butting is achieved within the outside diameter and there is no gap and 100% butting of the joining faces which gives high rigidity acts like a single piece.

Figure 6:
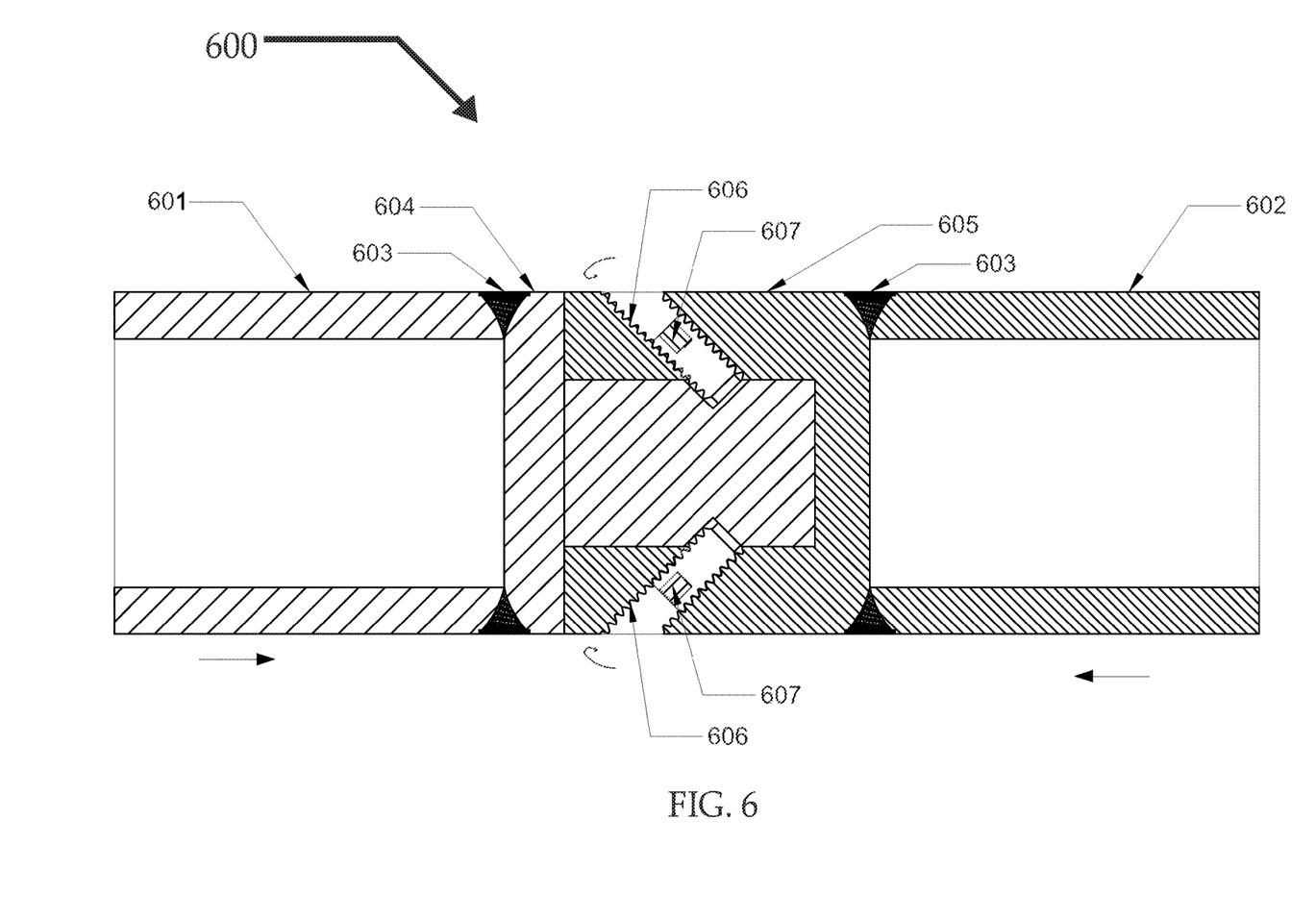
FIG. 6 illustrates assembly with a cross sectional view of a modular holding of structural joints, according to an embodiment therein.

In an embodiment, FIG. 6 is a cross sectional view of modular holding of structural joints. Here, requirement is modular locking of the two parts 601 and 602 by rigidly can be almost importance. Axial run out adjustment may not be that critical and required and if required also can be adopted. However in the FIG. 6 shown with modular locking as explained above with angular locking screw 607 on thread 606 and tightened together for locking of male and female portion corresponding 604 and 605 rigidly with the butting face. However not shown in the FIG. 6 central portion concentric hole can be made in 604 and 605 to reduce the weight and the cost appropriately designing without affecting the rigidity. Here, number of screws 607 can be designed as per application and the size of the modular connection required. The major advantage is that the modular connection by utilizing the space within the 604 and 605 and corresponding 601 and 602 for which modular holding is required. Here no material protruding out from the surface of 601 and 602 anything assembling and fixing over that members can not have any problem, where flange may become obstruction for designing like this as shown in the FIG. 2.2. At the same time lot of saving on material and processing cost of flanges, nut bolts and fasteners is replaced by simple grub screws can be tightened and loosened easily by required allen keys.

Figure 7:
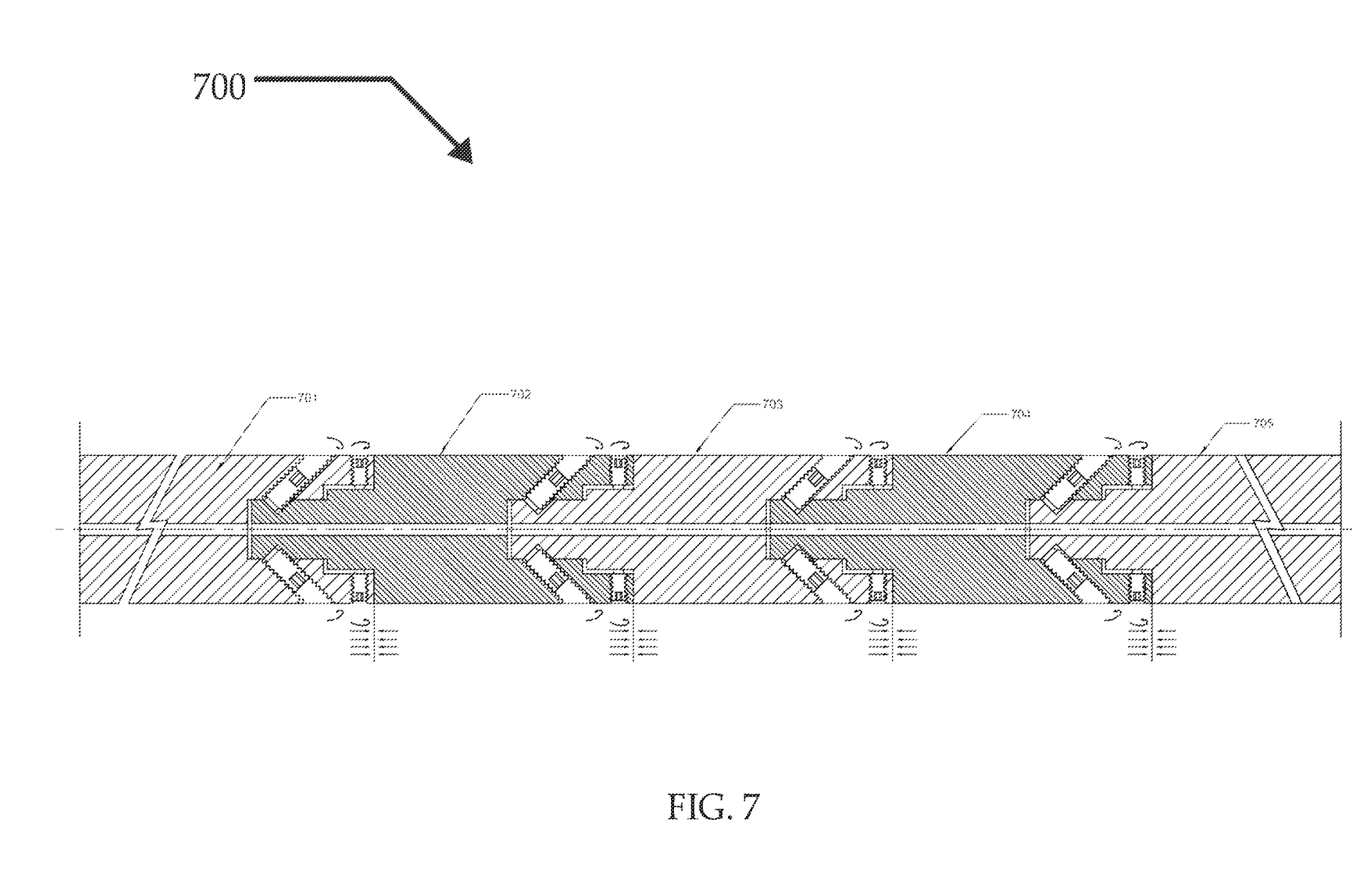
FIG. 7 illustrates assembly with a cross sectional view of serial joints of multiple modular holding, according to an embodiment therein.

According to an embodiment, FIG. 7 illustrates assembly with a cross sectional view of serial joints of multiple modular holding. As per the embodiment, FIG. 7 showing multiple serial connection of modular locking for any numbers as shown in the 701, 702, 703, 704 or 705 but not limited to any number. As explained in the FIG. 5 assembly of modular locking can be done starting from 701 to 702 axial and radial adjustment can be controlled in microns. 702 can be connected with 703, same procedure can be repeated for all other modular connection and at the end of 705 can be achieved axial and radial run out in microns. In cutting tool application anywhere in between or at the end of 705 cutting edges or modular connection with cutting edges can be designed as per the required design and application.

Figure 8:
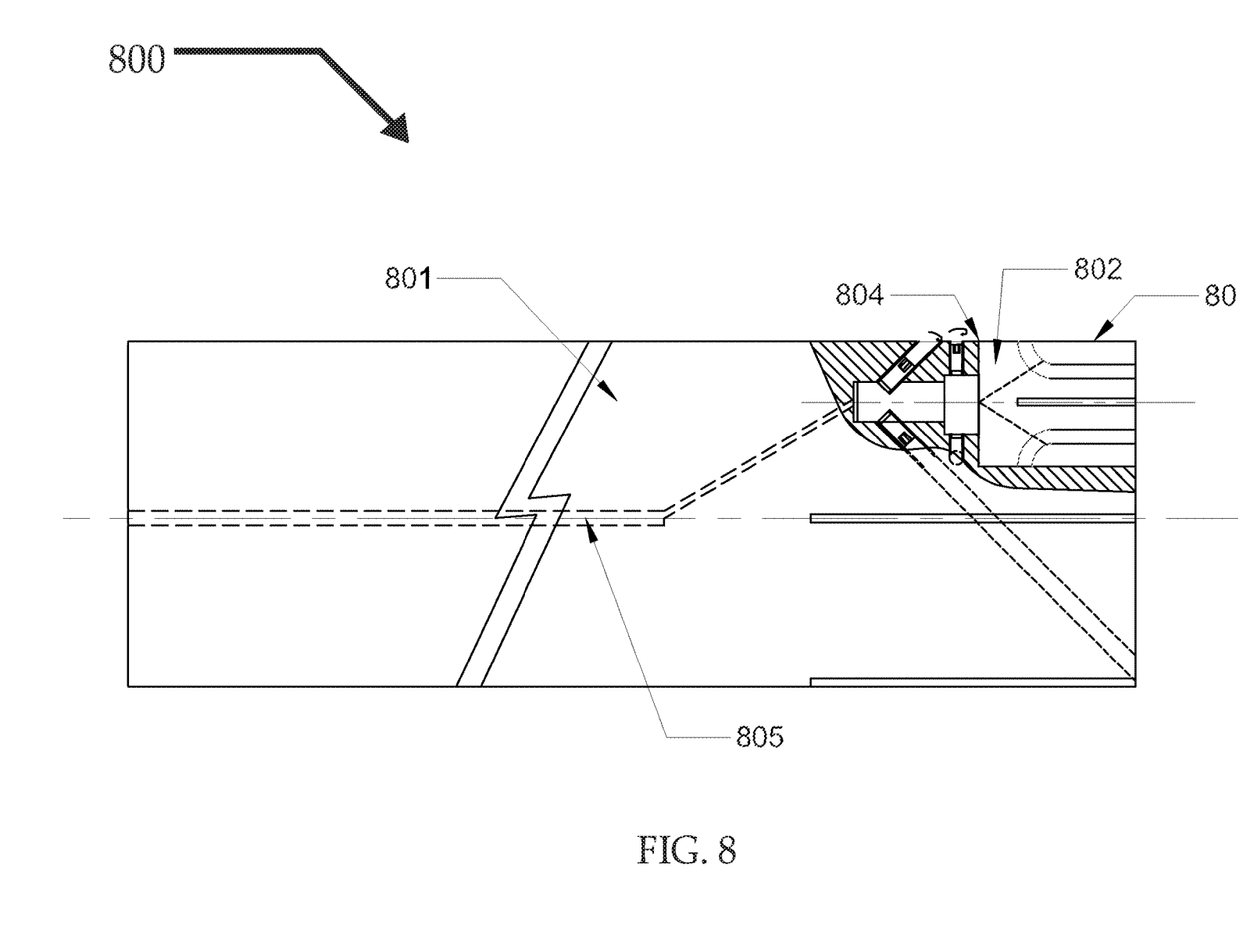
FIG. 8 illustrates assembly with cross sectional view of padded type of reamer with modular cartridge type of holding with multiple cutting edge, according to an embodiment therein.

According to an embodiment now referring FIG. 8 shows assembly with cross sectional view of padded type of reamer with modular cartridge type of holding with multiple cutting edge. Here, the traditional usage of blades used like in Mapal design is replaced by innovative modular locking system where 802 is made up carbide not limited to any other cutting materials HSS, Ceramic, PCD, CBN, steel with brazed type etc., as per the design requirement and also the cutting edge 803. Further, the modular locking as explained in FIG. 5 is designed and mounting screws can be designed as per the requirement of size and criticality. Axial screws are used for size adjustment by shifting 802 in axial direction an projecting out cutting edge 803 to the required size of 3-20 micron from the pad and the inline angular screw can be tightened and adjusted to get the require back tapper and clamping of 802 rigidly by face butting 804. Here, number of cutting edges can be one but not limited to 2, 4, 6 or 8 as per the design and application. Further, once the cutting edge is used it can be rotated for other cutting edges. Cartridge 802 can be replaced by new cartridge. Considerable cost saving can be achieved and at the same time higher speed and feed can be achieved.

Figure 9:
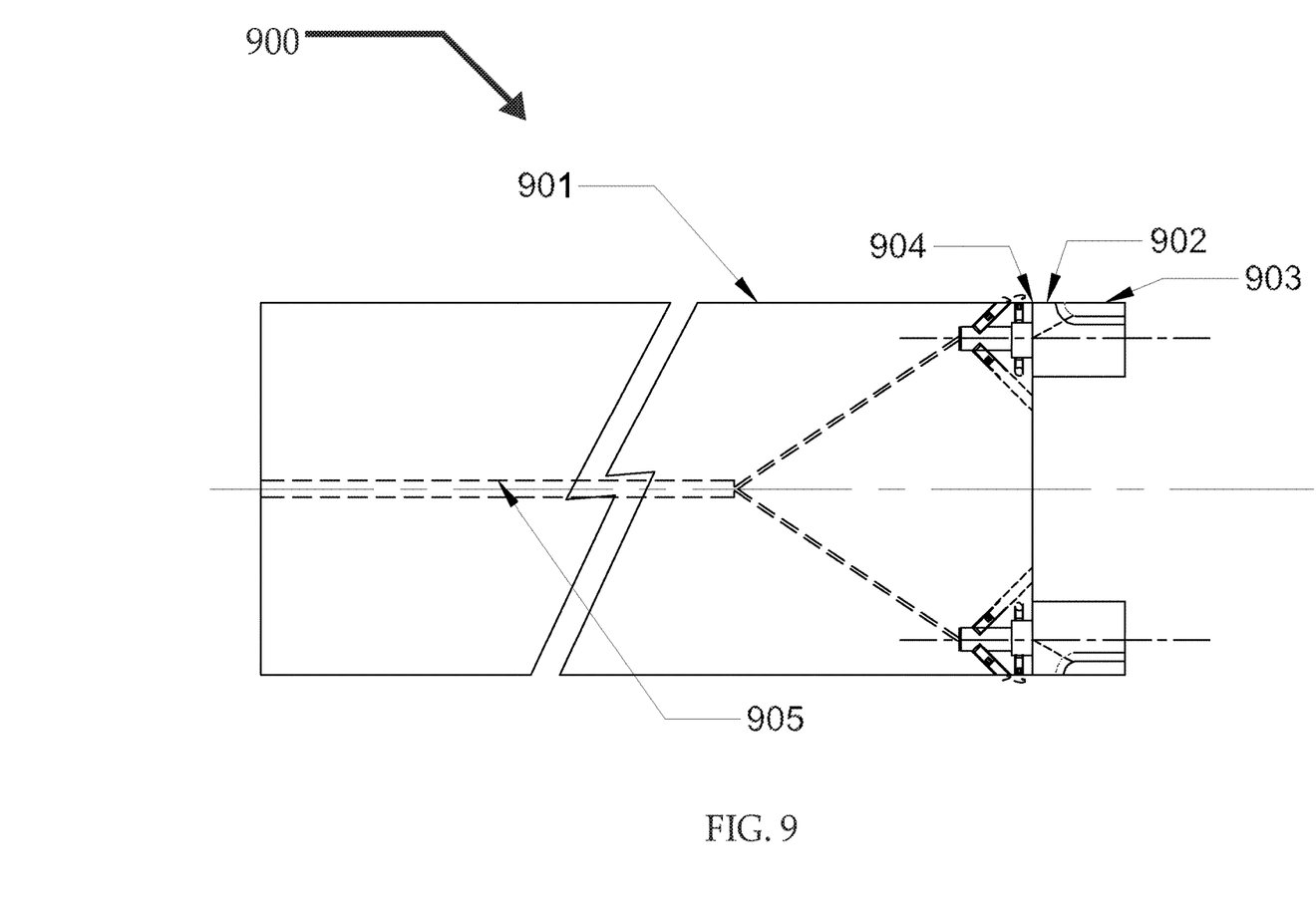
FIG. 9 illustrates assembly with multiple cartridges used for boring, reaming, milling and in tooling design, according to an embodiment therein.

In an embodiment, FIG. 9 illustrates assembly with multiple cartridges used for boring, reaming, milling and in tooling design. As per the embodiment, FIG. 9 multiple modular cartridge holding system with cutting edges with single or multiple cutting edges. 901 is a tool holder body and 902 cartridges as explained in the FIG. 5 can be designed for multiple cartridges. As shown in the FIG. 9, 902 are cartridges and 903 is cutting edge. Here by adjusting axial locking screws whole cartridge can be moved to the desired side and OD run out and size can be achieved on cutting edge 903 at the same time with the angular locking screw back tapper of cutting edge 903 can be achieved. This can be applied to reamer with multiple cutting edges and not limited to boring bars with the single or multiple cutting edges, ISO inserts, boring bars, milling cutters etc., as per the design and application. Cartridge 902 can have single cutting edge or multiple cutting edges as per the design and application. Cost reduction in tooling can be achieved with the novel application of the modular holding.

Figure 10:
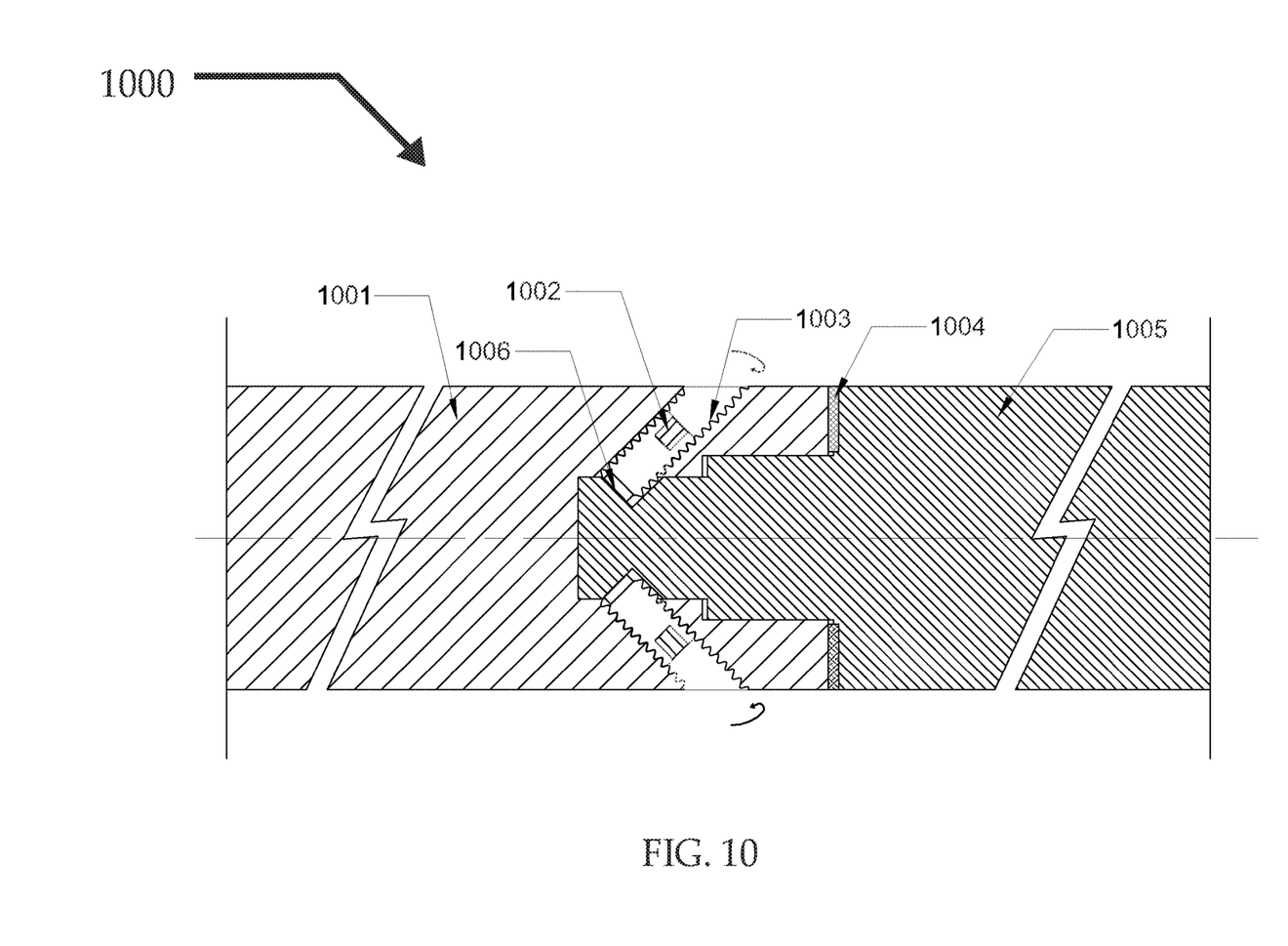
FIG. 10 illustrates assembly with a cross sectional view of coupling type of modular holding, according to an embodiment therein.

According to an embodiment, FIG. 10 illustrates assembly with a cross sectional view of coupling type of modular holding. As per the embodiment, FIG. 10 is a cross sectional view of typical modular joints can be designed for shaft joining or coupling as per the design and application. Here, 1001 is considered as motor side or drive side as a female part of modular joint. 1005 as connected shaft side as a male part of modular joint. As explained in the embodiment axial adjustment not shown in the drawing can be used only if it is required and angular holding grub screws 1003 is used for locking the joints rigidly. Number of grub screws can be designed as per the size and application. Modular joints on the butting face designed with Gasket/'O'ring/Sealing Elements 1006 which can helps to avoid vibration, sealing as well as required expansion and flexibility in the coupling joints which is very essential. Modular joints are rigid and economical.

Figure 11:
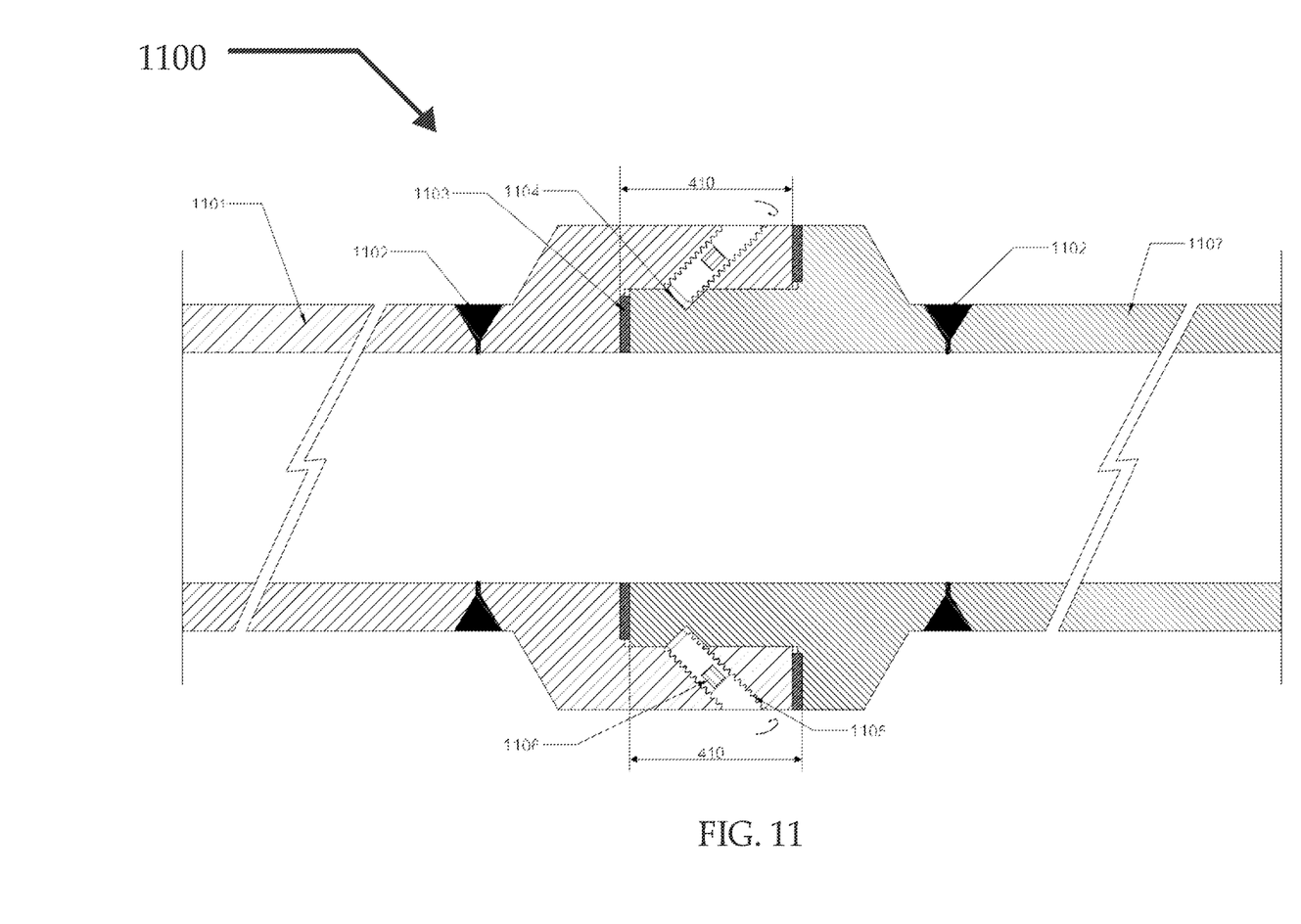
FIG. 11 illustrates assembly with a cross sectional view of piping joint or hollow shaft modular holding with sealing, according to an embodiment therein.

According to an embodiment, FIG. 11 illustrates assembly with a cross sectional view of piping joint or hollow shaft modular holding with sealing. As per the embodiment now referring FIG. 11 cross sectional view of typical piping or hollow shafts modular joining system. Here full internal area of pipes or hollow shafts are used for the intended purpose or flow of fluid inside. This modular joint can be designed for piping, pipe fittings, valves, piping instruments, modular connection. Here 1101 is the pipe and female part can be joined together by welding 1102 is forming the female part of the modular joint and 1107 is a pipe and male part may be joined together by welding 1102 is forming the male part of the modular joint. Further, axial locking may not be used much and only if in the critical design can be used if required. Angular locking Grub Screw 1106 is clamped for locking the joints rigidly. Number of grub screw required can be designed as per the size and application. Here Sealing Element, 'O'ring, Gasket are designed and provided in two places of the butting faces of the male and female parts which acts as a sealing element with the modular locking. The design is simple, rigid, leak proof and cost effective.

According to an embodiment, a rigid modular holding system with axial and radial compensation is designed to use for modular holding in engineering, construction, machine building field where above short comings are eliminated by material used within the size of joining parts. Face butting is 100% face to face locking. Alignment or concentric locking of mating parts is achieved by simple design of angular locking by the grub screw. Axial locking screws may be used as per the design if required to achieve the alignment in rotary or static parts modular locking.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

I claim:

1. A rigid modular holding system with radial and axial compensation comprising:
   a female portion (301), a male portion (401), and a plurality of locking grub screws or socket head screws;
   characterized in that the female portion (301) having a butting face (308), a cylindrical portion (304) with a plurality of threaded hole for axial adjustment (303), a cubical part (305) with a plurality of threaded hole for radial adjustment (302), and a central (311) through coolant;
   wherein the male portion (401) having a cylindrical portion (402), a cubical portion (403) with a plurality of notch (404), gasket or sealing element (1103) and another central (411) through coolant; and
   wherein the locking grub screws or socket head screws provided for axial and radial adjustment; wherein the locking grub screw configured for radial adjustment is an angular locking grub screw (307); wherein the locking grub screw configured for axial adjustment is an axial locking grub screw (306);
   wherein said male portion (401) and female portion (301) are connected together by said butting face (308) within an area of mating parts, wherein an axial run out and locking is controlled by said axial locking grub screws (306) and a radial run out and locking is controlled by said angular locking grub screws (307); and
   wherein the axial locking grub screws (307) and the angular locking grub screw (306) together achieves a rigid face butting and at the same time adjusts and controls run out axially and radially in microns.

2. The modular holding system of claim 1, wherein said cylindrical portion (304) of the female portion (301) is replaceable by a triangular or hexogen or rectangular or heptagon or cubical portion.

3. The modular holding system of claim 1, wherein said axial and radial compensation is developed with a cylindrical mounting along with a cubical locking system concentric in the holding parts, which acts as anti rotational as well as guiding and holding the parts together.

4. The modular holding system of claim 1, wherein the modular holding system enables for guiding and facilitating with the notch (404) for face butting (407) when attached to a cartridge (802) as a connecting part (405).

5. The modular holding system of claim 1, wherein a marking or numbering is made on an outer surface of the mating parts so that same sides are assembled together to get the required accuracy and repeatability.

6. The modular holding system of claim 1, wherein said threaded holes on female portion (301) and corresponding locking flats on the male portion (401) is selected based on the type and shape of mating parts; wherein the mating parts are designed in such a way that to get rigid locking.

7. The modular holding system of claim 1, wherein said holding system connected together for obtaining serial connections or combination connections.

8. The modular holding system of claim 1, wherein said face butting (407) is achieved between joining faces of the female and male portion.

* * * * *